Figure 5:
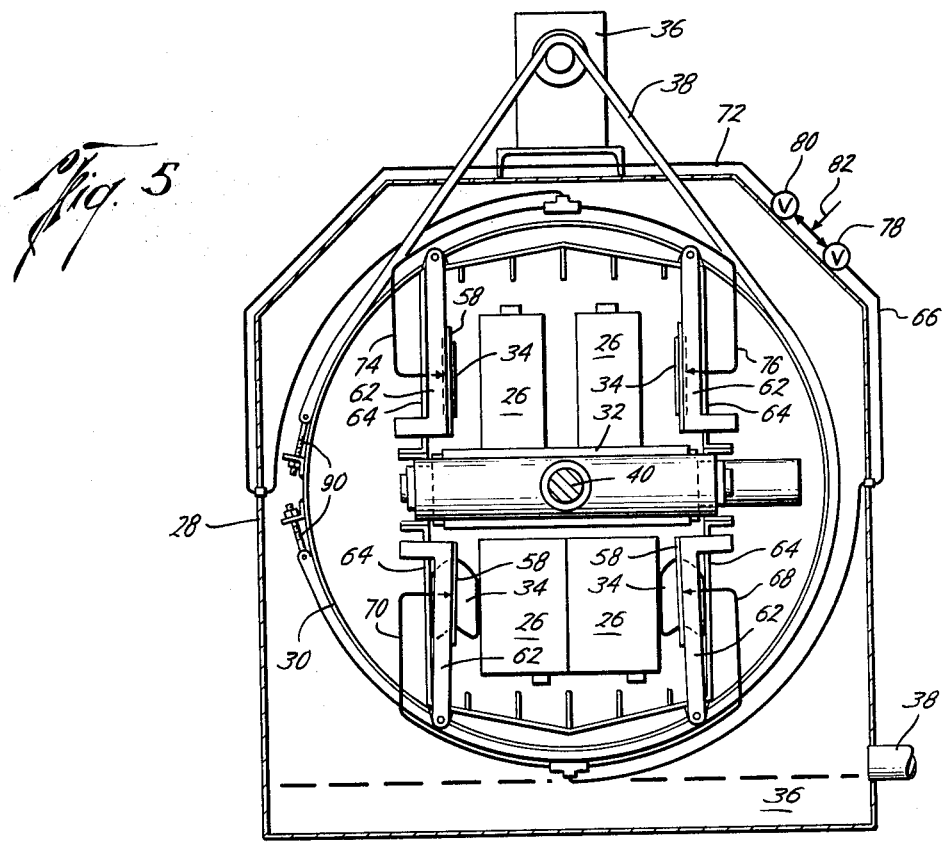

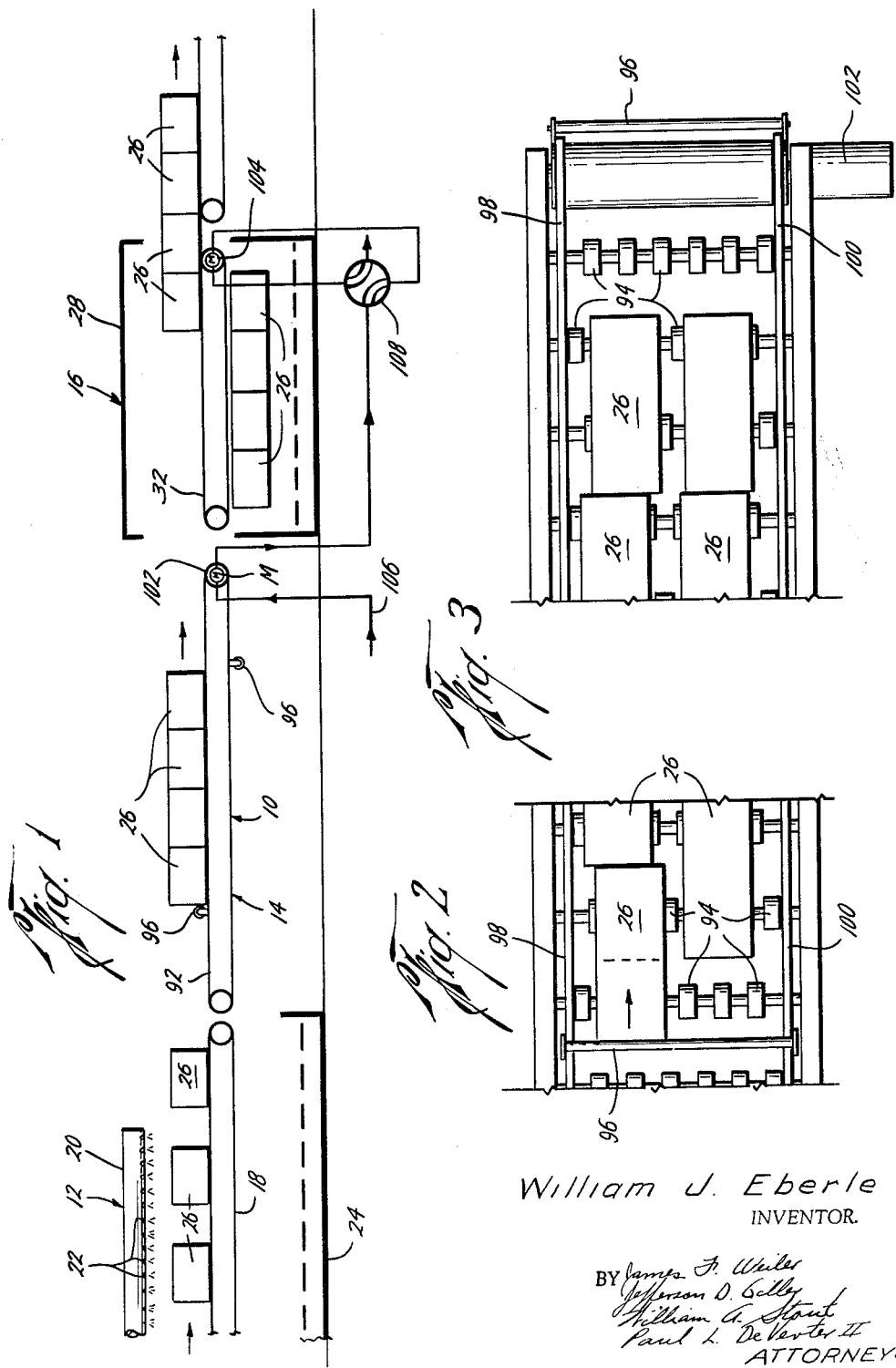

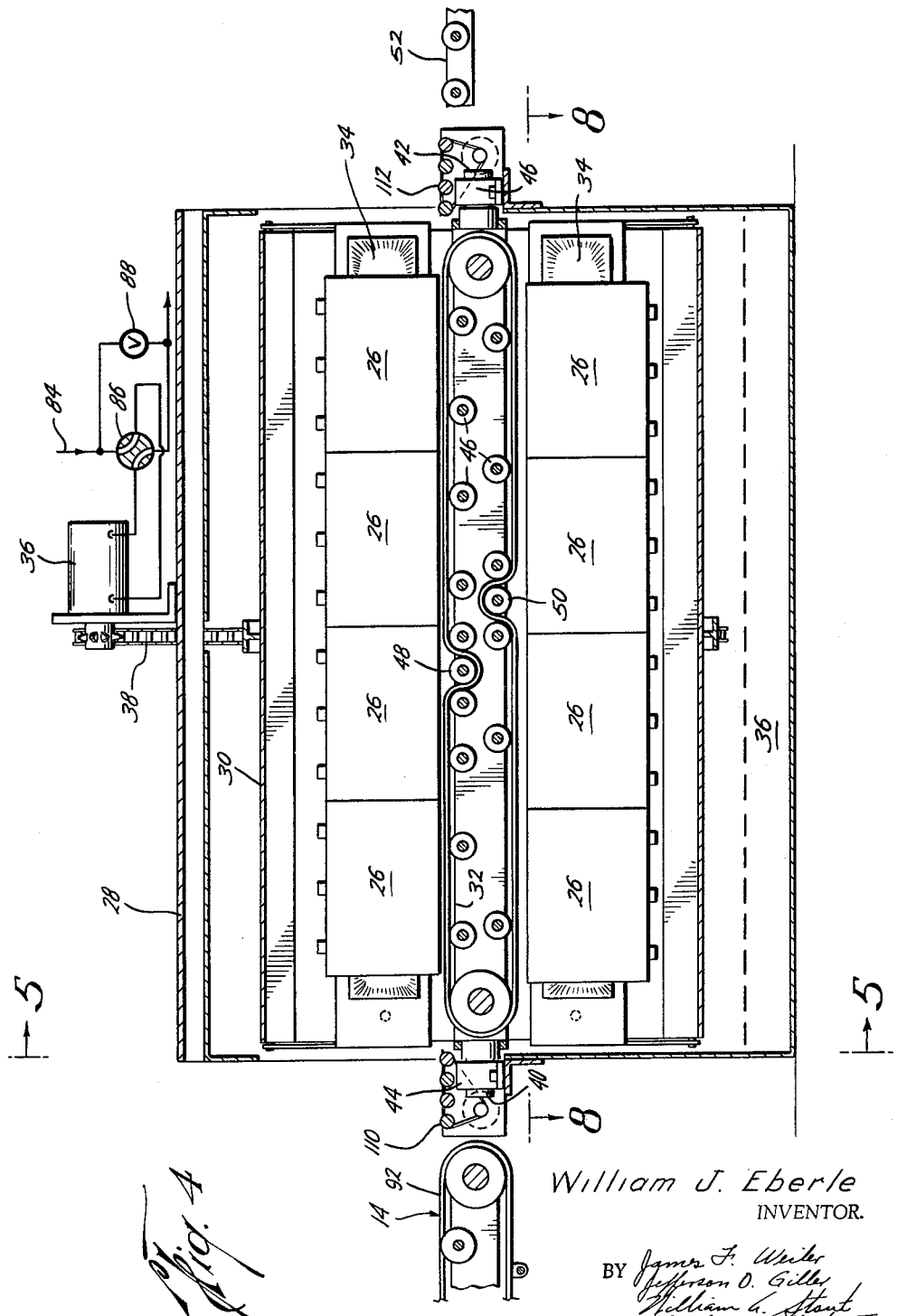

Jan. 26, 1965  W. J. EBERLE  3,167,196
BATTERY AQUALIZING APPARATUS
Filed April 17, 1963  5 Sheets-Sheet 3

William J. Eberle
INVENTOR.

BY James F. Weiler
Jefferson D. Giller
William L. Stout
Paul L. DeVester II
ATTORNEYS Jan. 26, 1965  W. J. EBERLE  3,167,196
BATTERY AQUALIZING APPARATUS
Filed April 17, 1963  5 Sheets-Sheet 4

William J. Eberle
INVENTOR.

BY
ATTORNEYS

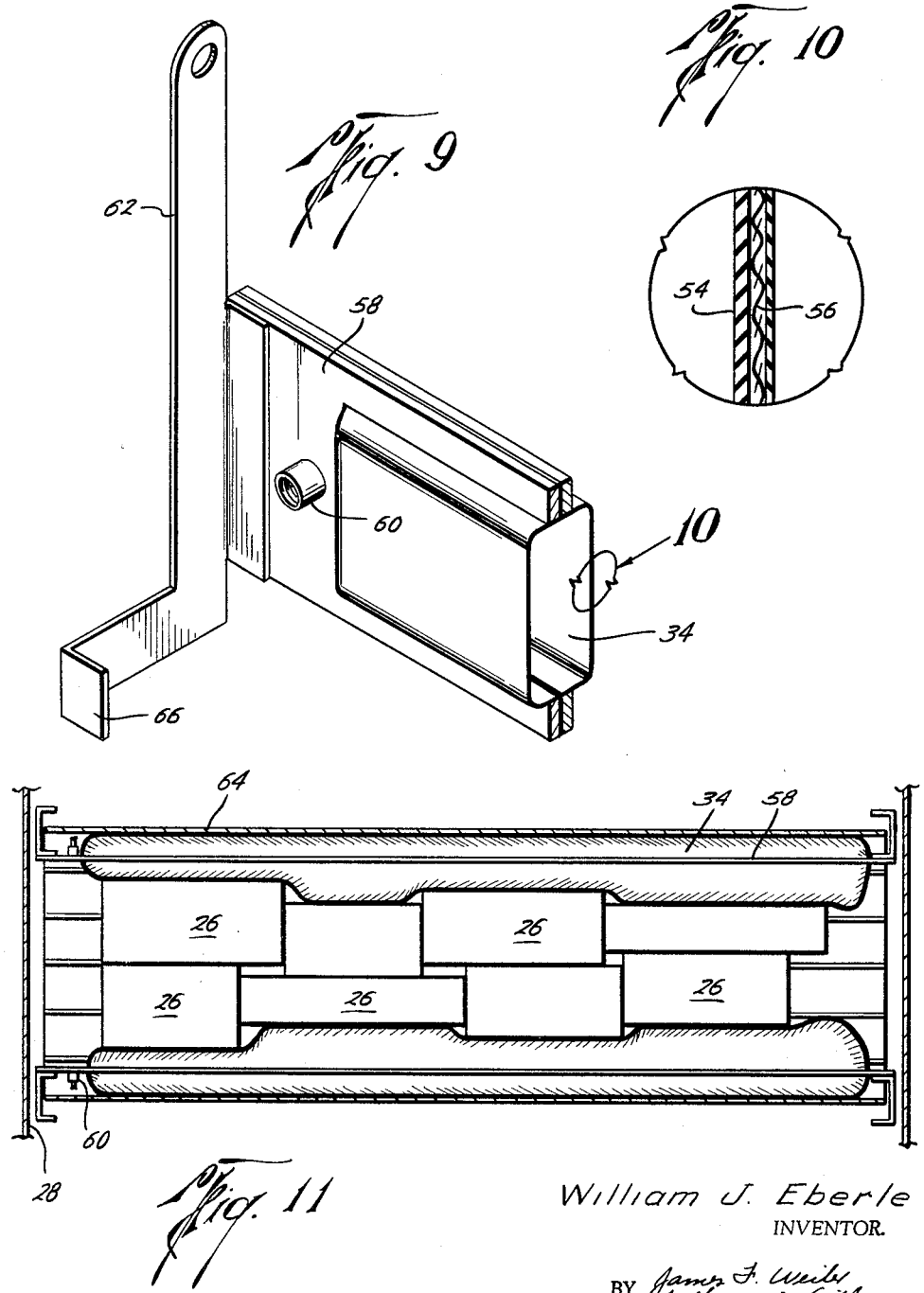

United States Patent Office 3,167,196
Patented Jan. 26, 1965

3,167,196
BATTERY AQUALIZING APPARATUS
William J. Eberle, Dallas, Tex., assignor to Vitalic Battery Company, Inc., Dallas, Tex., a corporation of Delaware
Filed Apr. 17, 1963, Ser. No. 273,732
5 Claims. (Cl. 214—308)

The present invention relates to a battery aqualizing apparatus, and more particularly relates to a battery aqualizing apparatus in which water is filled and emptied from batteries.

Generally, water which may include electro formation accelerating agents, or other materials or chemicals is added to a battery and is emptied therefrom so as to wet the battery prior to the addition of the battery acid. This wetting process facilitates an initial electro formation of the battery. One method of performing this process is by hand, such as dipping the battery into a container of water, filling the battery with water and then dumping the water therefrom. This method is time consuming and expensive. Another method is to wet the component parts before they are assembled. However, this prevents high voltage testing of the parts during assembly, causes difficulty when adding hot compounds to wet parts, and generally makes a messy assembly line.

The present invention is directed to a battery aqualizing apparatus and more specifically to an assembly for inverting and emptying the water from the filled battery.

It is therefore the object of the present invention to provide an improvement in a battery aqualizing apparatus which will automatically receive and empty various sizes and shapes of batteries.

Yet a further object of the present invention is the provision of inflatable battery gripping members which firmly but gently grip various sized and shaped batteries and includes means for inverting the batteries for draining the water therefrom, and because of the resilient action of the inflated means, shake the battery on inverting and thereby prevent the retention of water inside of the battery.

A further object of the present invention is an improvement in a battery aqualizing apparatus which includes a conveyor means for holding a plurality of different sized and shaped batteries, two inflatable battery gripping members positioned along each edge of the conveyor means and which when inflated gently but firmly grip the sides of any battery thereon and thereby avoid gripping the soft battery top, and means for inverting and draining the batteries when they are supported between the inflated gripping members.

A still further object of the present invention is the provision of a battery loading assembly for use in combination with the battery emptying assembly which includes a battery loading conveyor aligned with the battery emptying conveyor and includes operating means for simultaneously operating the battery loading apparatus in conjunction with the battery emptying apparatus.

Yet a still further object of the present invention is the provision of a battery loading conveyor aligned with and used in conjunction with a battery emptying assembly for loading the emptying assembly with filled batteries and which includes a loading means having at least one rod transversely positioned across the conveyor means for periodically accumulating the production line output of batteries from a water filling station and which while acting intermittently, acts to accumulate and load the water filled batteries into the emptying apparatus at a rate that will not interrupt the production line and battery water filling process.

Still a further object of the present invention is the provision of the improvement in a battery aqualizing apparatus of a battery emptying assembly which includes a rotatable support means, conveyor means for moving the batteries into and out of the emptying assembly and is connected to and supported by the rotatable support means, an elongate inflatable battery gripping member positioned along each edge of the conveyor means and carried by the rotatable support whereby batteries on the conveyor may be gripped between the gripping members when they are inflated, and means for inverting the rotatable support thereby emptying the batteries held between the inflated gripping members.

Yet a further object of the present invention is the improvement in a battery aqualizing apparatus of a battery emptying assembly which includes inflatable members on each side of a conveyor for gripping batteries, a pivoted connection supporting the inflatable members from a rotatable support whereby when the members are inflated they not only grip the batteries on the conveyor but lift the batteries from the conveyor as they rotate about the pivoted connections.

A still further object of the present invention is the provision of an improvement in a battery aqualizing apparatus of an accumulator or battery loading assembly which acts in conjunction with a battery water emptying assembly for collecting water filled batteries in a battery production line and which does not interfere or interrupt the flow of batteries through the production line process.

Figure 6:
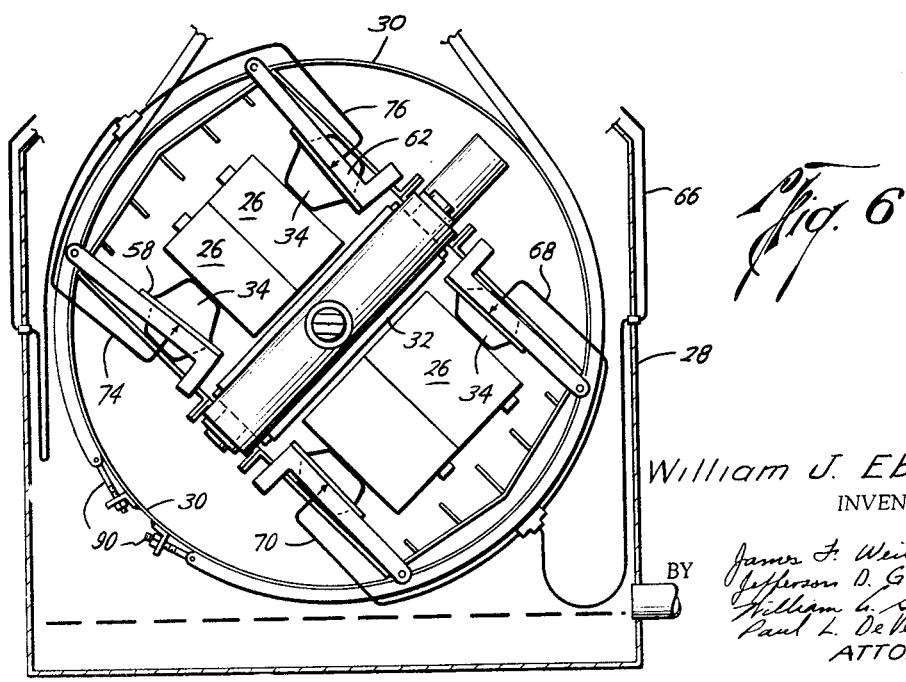
Figure 7:
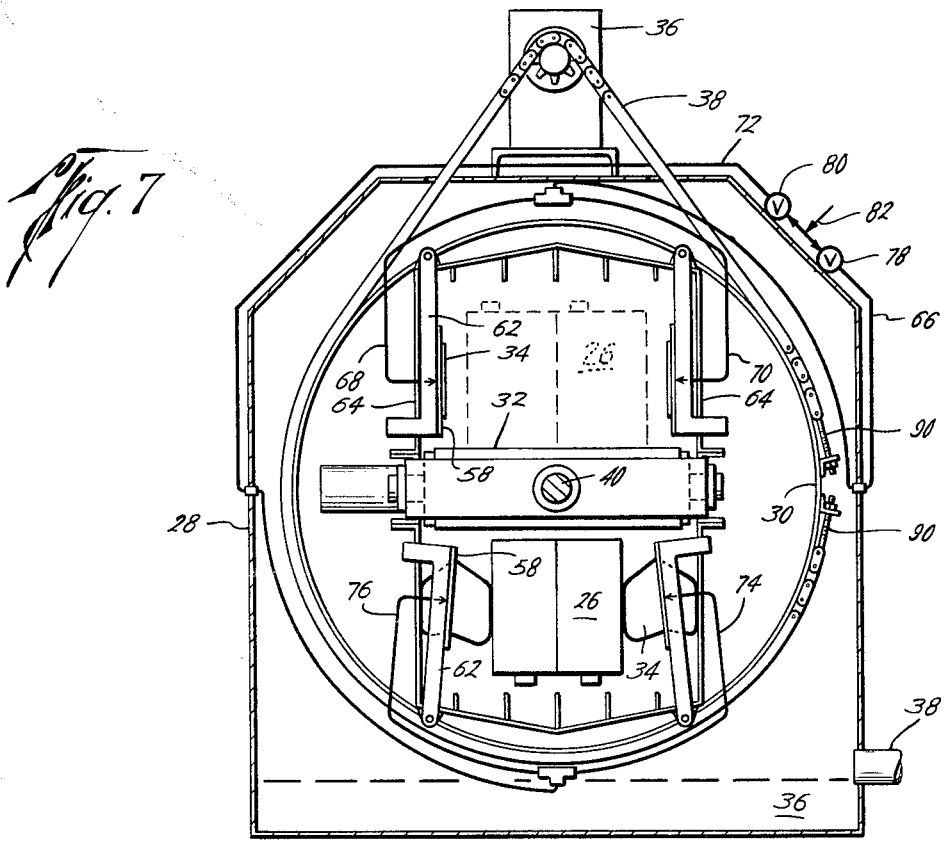
Figure 8:
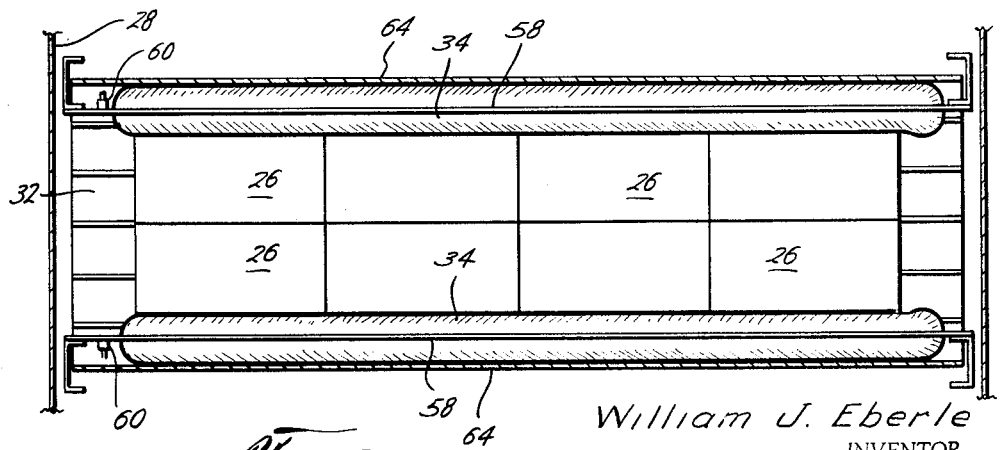

Other and further objects, features and advantages of the invention will be apparent from the following description of a presently preferred embodiment of the invention, given for the purpose of disclosure and taken in conjunction with the accompanying drawings, where like character references designate like parts throughout the several views, and where, FIGURE 1 is a schematic view illustrating the steps involved in aqualizing a battery by the battery aqualizing apparatus of the present invention, FIGURE 2 is a fragmentary elevational view of one end of the battery accumulator or battery loading assembly of FIGURE 1, FIGURE 3 is a fragmentary elevational view of the second end of the accumulator or battery loading assembly shown in FIGURE 1, FIGURE 4 is an enlarged cross-sectional view of the battery inverting or emptying assembly shown in FIGURE 1 with the batteries on the bottom being emptied while filled batteries are being inserted into the top of the assembly, FIGURE 5 is a cross-sectional view taken along the line 5—5 of FIGURE 4, FIGURE 6 is a cross-sectional view similar to FIGURE 5, but showing the battery inverting or emptying apparatus in the process of rotation, FIGURE 7 is a cross-sectional view similar to FIGURES 5 and 6, but showing the inverting or battery emptying apparatus in position draining one set of batteries while another set of batteries which have already been emptied are shown in dotted lines as being removed from the apparatus, FIGURE 8 is a cross-section taken along the line 8—8 of FIGURE 4, FIGURE 9 is an enlarged fragmentary perspective view of one end of one of the inflatable gripping members which are used to grip and hold the batteries in the inverter or battery emptying assembly, FIGURE 10 is an enlarged cross-sectional view of an insert 10 taken from FIGURE 9, and FIGURE 11 is a cross-sectional view smilar to FIGURE 8 showing the automatic adjustability of the inverter or battery liquid emptying assembly to automatically adjust for and accommodate various sized and shaped batteries.

Referring now to the drawings, and particularly to FIGURE 1, a battery aqualizing apparatus, generally indicated by the reference numeral 10 is provided, usually in use with a production line for making batteries and generally includes a water filling assembly 12 for filling the batteries with water, a battery loading assembly or accumulator 14 for collecting the filled batteries and a battery inverter or water draining assembly 16 which provides the structure for inverting and draining the water filled batteries and, after draining, uprighting the batteries for further processing. The battery aqualizing apparatus 10 of the present invention is primarily adapted to be used in a manufacturing assembly line for aqualizing batteries of different sizes and shapes and is able to process batteries from a single or multiple assembly line.

Still referring to FIGURE 1, any suitable type of water filling assembly 12 may be utilized, here shown as a conveyor belt 18 which receives a plurality of batteries 26 from a manufacturing assembly line, a pipe 20 having a plurality of spray openings 22 for spraying water into the top of the batteries for filling the batteries with water and a tank 24 for recovering the spray of water not placed in the batteries 26. Of course, any suitable type of water filling assembly may be utilized.

The present invention is specifically directed to the provision of the battery inverter or water dumping assembly 16 and the use of a battery accumulator or loading assembly 14 used in combination with the inverter or water emptying assembly 16.

Referring now to FIGURES 1, 4, 5 and 8, the inverter or battery emptying assembly 16 generally includes a housing 28, a rotatable support 30, a conveyor means such as a belt 32 which carries filled batteries into and drained batteries out of the assembly 16, inflatable battery gripping members 34 positioned along the outer edge of the conveyor means 32, and preferably having four of such inflatable members for operation on both sides of the conveyor belt 32, and rotatable means such as motor 36 and belt 38 for inverting the rotatable support structure 30, the conveyor belt 32, the inflatable gripping members 34 and any batteries 26 which may be secured and held between the gripping members 34. Thus, the incoming filled batteries 26 are received on the conveyor belt 32, the inflatable gripping members 34 are inflated thereby securely holding any batteries 26 on the conveyor belt 32 between the oppositely spaced gripping members 34, and when the entire assembly is inverted by the motor and chain drive 36 and 38, the batteries 26 are turned upside down thereby draining the water therefrom. After draining they are again uprighted and the conveyor belt 32 will move them out of the inverting or water emptying assembly 16 and along the manufacturing assembly line.

Referring specifically to FIGURES 4 and 5, the housing 28 generally includes a bottom therein for receiving water 36 and an overflow pipe 38 for withdrawing the overflow of the dumped water 36 from the housing 28. The rotatable support structure 30 is preferably circular and may be mounted for rotation at each end by shafts 40 and 42 suitably journalled in bearing housings 44 and 46 from the housing 28.

The pulley belt 32 is continuously supported about a plurality of rollers 46 and preferably includes belt tightening rollers 48 and 50 which may be moved transversely to the belt 32 for tightening it on the rollers. In addition, the adjustable rollers 48 and 50, one being on the top and the other being on the bottom of the belt 32 act to keep the portion of the belt 32 which is on the bottom from dragging and contacting and rubbing the batteries when they are in an inverted position. The rollers 46, 48 and 50 are all suitably supported from the rotatable support 30 and the conveyor belt 32 is thus inverted when the rotatable support is rotated. The belt 32 is also aligned with the battery accumulator or battery loading assembly 14 for receiving the water filled batteries therefrom, and in addition is aligned with an outgoing conveyor assembly 52 which receives the emptied batteries from the assembly 16 and transports them along the manufacturing assembly line for other processes.

Referring now to FIGURES 4, 5, 8 and 9, the structure and operation of the inflatable gripping members are best seen. The inflatable gripping members 34 are generally an elongate inner tube like structure which may be comprised of any suitable material such as a suitable rubber 54 and expandable fabric 56 (FIGURE 10) which is suitably supported in an elongate support member 58 which includes a fluid opening 60 which is in fluid communication with the interior of the inflatable members 34 for admitting and discharging a fluid such as air to the interior of the members 34. The elongate supports 58 are pivotally supported from the rotatable support structure 30 by means of a pivot arm 62. An elongate positioning wall 64 is rigidly connected to the rotatable support structure 30 and is parallel to each of the inflatable members 34 on the side remote from the conveyor belt 32.

The purpose of having the positioning wall 64 adjacent the inflatable members 34 is that when the members 34 are inflated, one side will contact the positioning wall 64, and thus force the inflatable members 34 inwardly and since the elongate supports 58 are pivotally secured to the rotatable body 30, the supports 58 and the inflated members 34 will in addition to pushing the batteries 26 together, as best seen in FIGURE 8, and gripping the batteries, will move upwardly or away from the conveyor belt 32 and thus will actually lift the batteries 26 from the conveyor belt 32. Limit shoulders 66 are connected to each of the pivoted levers 62 and arranged to contact the positioning wall 64 to limit the inward movement of the inflatable members 34 and the elongate supports 58 in order to prevent the rigid supports 58 from contacting and injuring the batteries 26 as they are moved inwardly.

The operation of gripping and lifting up of the batteries 26 by the inflatable members 34 when they are inflated is best seen in FIGURE 6. The inflatable members 34 are advantageous in that they grip and securely hold the sides of the batteries 26 instead of gripping or contacting the upper surface of the batteries 26 which are generally during this period of manufacture provided with a soft compound which is subject to deformation and damage by gripping devices. However, the inflatable members 34 may grip and hold the battery 26 with a light pressure grip because of the large area of contact of the inflated members 34 against the sides of the battery 26.

Referring to FIGURES 8 and 11 it is also noted that inflatable members 34, because they will adapt to any conformation, may be used to hold and grip various sized and shaped batteries 26. Generally, only a single sized and shaped battery is processed through a manufacturing assembly line as illustrated in FIGURE 8, however, without any adjustment of the assembly 16, odd sizes and shapes of batteries may be easily and conveniently handled by the apparatus 16 as shown in FIGURE 11.

Referring to FIGURES 5, 6 and 7, suitable air lines and control equipment are connected to the inflatable gripping members 34 for inflating and discharging air into those members at the desired time. Thus, an air line 66 is in communication with branch lines 68 and 70 to the two inflatable members 34 on one side of the conveyor belt 32. Line 72 is in communication with branch lines 74 and 76 and thus to the inflatable members 34 on the second or top side of the conveyor belt 32. Suitable valve means (FIGURE 5) 78 and 80 are provided which are connected to an air source 82 for inflating and deflating the inflatable members 34.

Referring to FIGURES 4, 5, 6 and 7, the motor 36 and chain drive 38, the chain being connected around the rotatable support body 30, is provided to alternately invert and upright the support 30, and the connected conveyor belt 32, and the batteries supported thereon between the inflated gripping members 34. It is preferable to merely invert and upright the rotatable body 30 as it reduces the problem of providing air connections to the inflatable members 34. As seen in FIGURE 4 a suitable air source 84 is provided which is controlled by a two-way valve 86 and valve 88 for alternately reversing the motor 36 to provide the desired roll over or inversion of the rotatable body support 30. On FIGURES 5, 6 and 7 it is noted that the opposite ends of the chain 38 are suitably secured to the rotatable body 30 by suitable nut and bolt assemblies 90 which in addition to securing the chain 38 to the body 30 provide an adjusting mechanism for adjusting the slack of the chain 38 to its gear connection to the motor 36. Also from FIGURES 5, 6 and 7, it is noted that when the batteries 26 are inverted, since they are not held rigid, but are firmly but gently gripped between the resilient inflated members 34 that the rotating movement of the batteries allows them to shake thereby assisting in shaking out the water inside which would normally catch on the upset shoulder (not shown) inside of the battery. By providing a pair of elongate inflatable gripping members 34 both above and below the conveyor means 32 one batch of batteries may be drained while another batch of batteries is either being inserted into or removed from the inverter 16. By this action the inverter 16, may, even though it loads and unloads batteries intermittently, perform the emptying process at a sufficient rate so as not to interfere with the usual production assembly line.

Because of the need for intermittent loading and unloading of the inverter or battery emptying assembly 16, a suitable battery accumulator or battery loading assembly 14 is desirable to change the batteries from the normal production line movement rate into an intermittent movement into the inverter 16. Referring now to FIGURES 1, 2 and 3, the accumulator or battery loading assembly 14 includes a conveyor means such as a plurality of idle rollers 94. The conveyor means 92 is aligned between conveyor 18 and conveyor belt 32 and receives the water filled batteries 26 from the water filling assembly 12. That is, the batteries generally roll from the conveyor 18 to the conveyor 92 and randomly roll thereon. However, a pair of rods 96 are positioned transversely across the conveyor 92 and are connected at each end to rotatable chains 98 and 100 on each side of the conveyor 92 and are driven by a motor 102 for movement of the transverse rods 96 about the conveyor 92. Thus, when the motor 102 is actuated one of the rods 96 moves along behind the batteries 26 positioned on the rollers on conveyor 92, collects or accumulates the batteries and moves them along and onto conveyor belt 32 in the inverter or water emptying assembly 16. As shown in FIGURE 1, motors 102 and 104, which drive conveyor belts 92 and, are simultaneously actuated such as by a hydraulic system having a source of power 106 and which is controlled by the valve 108. Thus, the transverse rods 96 collect and load the inverter assembly 16 while the belt 32 is unloading the previously emptied batteries 26. While the batteries are allowed to collect or accumulate at the loading assembly 14 they are intermittently moved, but at a fast enough rate so as not to interfere with the batteries being received from the water filling assembly 12.

Referring now to FIGURE 4, powered rollers 110 may be provided between conveyor 92 and conveyor belt 32 and in addition powered rollers 112 may be provided between conveyor belt 32 and the outgoing conveyor 52, if desired.

In operation, the battery aqualizing apparatus 10 will handle either a single or multiple assembly line of batteries which will automatically fill the batteries with water and empty the water therefrom in order to wet the battery for preparation of the process of adding acid thereto. The filling assembly 12 receives from the normal manufacturing assembly line the batteries 26, and by any suitable means, such as the spray pipe 20 fills the batteries with water. From there they are conveyed and roll onto the idle rollers 94 on the conveyor 92 and are allowed to stack up and remain there until accumulated and loaded into the water inverter or water emptying assembly 16. Motors 102 and 104 are simultaneously actuated by the valve 108 thereby causing one of the transverse rods 96 to move around and behind the batteries which are randomly setting on the rollers 94 of the conveyor 92 and they are collected or accumulated into a train like batch and moved onto the conveyor 32. It is noted that this operation clears the conveyor 92 and prepares it to receive the oncoming water filled batteries from the water filling assembly 12 and thereby does not interrupt the production line operation.

Referring to FIGURES 4 and 5, the batteries on top of the conveyor belt 32 are then positioned on the conveyor belt 32 between two inflatable gripping members 32 which are along the outer edge of the conveyor belt 32. Air valve 80 is actuated thereby inflating the top set of inflatable members 34 which move outwardly and upwardly, move the batteries 26 together and securely grip and support them between the now inflated members 34 as best seen in FIGURE 6. It is noted that since one side of the inflatable members 34 contact the supporting wall 64 the elongate inflatable member supports 58 pivotally move inwardly and upwardly to move the batteries together and upwardly up off of the conveyor belt 32. However, limit shoulder 66 is provided to contact the supporting wall 64 to prevent the rigid elongate support 58 from moving too far inwardly so as to damage the batteries. It is to be noted in FIGURES 5 and 6 that when one batch of batteries 26 are being moved onto the top of the conveyor belt 32 and gripped, a second set of batteries 26 are already positioned in an inverted position and are draining on the bottom side of the conveyor belt 32.

After the incoming water filled upper batch of batteries have been securely gripped between the upper gripping members 34, the inverting motor 36 is actuated to move chain 38 and the rotatable support structure 30 as best seen in FIGURE 6, so that the water filled batteries are moved to an inverted position and drained while the now drained batteries are again uprighted and ready to be moved along the assembly line. Because of the flexible gripping feature of the inflated members 34, the batteries 26 will shake to some extent when they are inverted and will thoroughly drain the water from the batteries.

Referring to FIGURE 7, it is noted that the bottom set of batteries is in the draining position while the conveyor belt 32 is being actuated to move out one set of now empty batteries and receive another set of water filled batteries from the accumulator assembly 14.

It is noted from FIGURE 11 that the inverter or battery draining apparatus 16 will without requiring any further adjustment accommodate various sized and shaped batteries and will securely grip and hold the sides of the batteries without contacting or damaging the soft upper top of the batteries.

Thus, the present invention is well adapted to automatically collect, accumulate and drain water filled batteries regardless of the size or shape of the batteries and can accommodate single or multiple rows of batteries and does not interrupt or interfere with the production line process.

The present invention, therefore, is well suited and adapted to attain the ends and advantages mentioned as well as others inherent therein. While a presently preferred embodiment of the invention is given for the purpose of disclosure, numerous changes may be made in the details of construction and arrangement of parts which will readily suggest themselves to those skilled in the art and which are encompassed within the spirit of the invention and the scope of the appended claims.

What is claimed is:

1. In a battery aqualizing apparatus, the improvement in an assembly for emptying water from batteries comprising,
    rotatable support means,
    conveyor means for moving said batteries into and out of the assembly, said conveyor means connected to and supported by said support means,
    an elongate inflatable battery gripping member positioned and supported from the rotatable support member along each edge of both the top and bottom of said conveyor means for gripping and resiliently supporting different sized batteries positioned on the conveyor means for shaking movement upon inversion of the rotatable support means,
    a wall adjacent each inflatable gripping member on the side remote from the conveyor means whereby when the members are inflated the walls cause the members to move inwardly thereby gripping and holding any batteries positioned on the conveyor,
    means for inverting said rotatable support, conveyor means, and inflatable members whereby the batteries are drained by the shaking action of the inflatable members.

2. A battery emptying apparatus for emptying fluids from batteries comprising,
    a rotatable support means,
    conveyor means for moving fluid filled batteries into and empty batteries out of said apparatus,
    an elongate inflatable battery gripping member positioned along each edge of both the top and bottom of said conveyor means,
    a pivot connecting the gripping members to said rotatable support for pivotally supporting said members from the rotatable support means,
    wall means adjacent each inflatable gripping member on the side remote from the conveyor means whereby when the members are inflated the members pivot inwardly and upwardly thereby gripping and holding any batteries above the conveyor means,
    means for inflating and deflating said battery gripping members, and
    means for inverting said rotatable support, conveyor means, and inflatable members thereby draining said supported batteries.

3. A battery emptying apparatus for emptying fluid from batteries comprising,
    a rotatable support member,
    conveyor means for moving fluid filled batteries into and empty batteries out of said apparatus,
    a support pivotally connected adjacent its top from the rotatable support member along each edge of said conveyor,
    an elongate inflatable battery gripping member carried by said pivoted support,
    wall means adjacent each inflatable gripping member on the side remote from the conveyor means whereby when the inflatable members are inflated and contact the wall the inflatable members pivot inwardly and upwardly, gripping and holding any batteries above the conveyor means,
    means for inflating and deflating said battery gripping members, and
    means for inverting said rotatable support, conveyor means, and inflatable members thereby draining said supported batteries.

4. The invention of claim 3 including an engageable shoulder connected to said pivoted support for engaging said wall means on inward movement of said pivoted support thereby limiting the movement of the pivoted support towards said conveyor means and batteries.

5. The invention of claim 3 in combination with a battery loading assembly comprising,
    a battery loading conveyor aligned with the conveyor means,
    a rod transversely extending across the battery loading conveyor, and
    means moving said rod along the top of said battery loading conveyor thereby pushing any batteries thereon onto said conveyor means, said battery loading conveyor being operated simultaneously with the movement of said conveyor means but at a speed faster than the loading conveyor receives filled batteries.

References Cited by the Examiner

UNITED STATES PATENTS

| 2,226,068 | 12/40 | Mosley et al. | 214—312 |
| 2,609,113 | 9/52 | Huffman | 214—651 |
| 2,756,883 | 7/56 | Schreck | 214—313 |
| 2,766,469 | 10/56 | Kaye | 134—150 X |
| 2,832,090 | 4/58 | Ross | 214—314 X |
| 2,836,281 | 5/58 | Cookson. | |
| 2,865,411 | 12/58 | Johnson et al. | 214—312 X |
| 2,988,239 | 6/61 | Miller et al. | 214—312 |
| 3,056,625 | 10/62 | Timmerman | 294—63 X |

HUGO O. SCHULZ, *Primary Examiner.*

GERALD M. FORLENZA, *Examiner.*